United States Patent [19]

Blaschke et al.

[11] 4,423,367

[45] Dec. 27, 1983

[54] DEVICE FOR DETERMINING THE PARAMETER VALUES FOR STATOR RESISTANCE, PRINCIPAL INDUCTANCE AND LEAKAGE INDUCTANCE OF AN ASYNCHRONOUS MACHINE

[75] Inventors: Felix Blaschke; Leonhard Reng, both of Erlangen, Fed. Rep. of Germany

[73] Assignee: Siemens AG, Munich, Fed. Rep. of Germany

[21] Appl. No.: 299,780

[22] Filed: Sep. 8, 1981

[30] Foreign Application Priority Data

Sep. 11, 1980 [DE] Fed. Rep. of Germany ....... 3034275

[51] Int. Cl.³ .............................................. H02P 5/40
[52] U.S. Cl. .................................... 318/803; 318/805; 324/158 MG
[58] Field of Search ...................... 318/702, 803, 805; 324/158 MG

[56] References Cited

U.S. PATENT DOCUMENTS

| 3,909,687 | 9/1975 | Abbondanti ...................... 318/805 |
| 3,909,688 | 9/1975 | Blaschke et al. ................. 318/702 |
| 4,282,473 | 8/1981 | Dreiseitl et al. .................. 318/803 |

*Primary Examiner*—David Smith, Jr.
*Attorney, Agent, or Firm*—Karl F. Milde, Jr.

[57] ABSTRACT

Apparatus is disclosed wherein parameter values for the stator resistance, the main inductance and the stray inductance of an asynchronous machine is detected without using information about the rotor position. Thereby the apparatus consists of an EMF-forming circuit, an arithmetic control circuit, an arithmetic model circuit, and a control circuit. All circuits are coupled to form an overall model circuit designed according to a closed loop circuit to simulate the operational conditions of an asynchronous machine. In a balanced position of the control circuit the output signals of the control circuit represent the actual parameter values to be determined.

20 Claims, 13 Drawing Figures

DEVICE FOR DETERMINING THE PARAMETER VALUES FOR STATOR RESISTANCE, PRINCIPAL INDUCTANCE AND LEAKAGE INDUCTANCE OF AN ASYNCHRONOUS MACHINE

BACKGROUND OF THE INVENTION

1. Field of the Invention

The invention relates to an apparatus for determining the actual value of at least one of the stator resistance, the main inductance and the stray inductance parameters of an asynchronous machine having associated operating stator current and stator voltage vectors, from preset values of said parameters.

2. Description of the Prior Art

For the control of synchronous machines it is advantageous to set separate nominal values for the flux and the torque of the machine. One then obtains both a clear dynamic behavior easy to regulate and a high efficiency of the machine. For setting the desired flux, it must be possible to adjust the magnetizing component of the stator current, and for controlling the torque or the speed of rotation, the active component of the stator current, these two components being then combined to form the desired total stator current.

For the description of an asynchronous machine it is desirable to combine the currents flowing in the stator windings as a total stator current vector i of the magnitude i, and the stator voltages as a stator voltage vector u of the magnitude u. The magnetic field of the machine can be described by a flux vector, and the induced EMF by an EMF vector. In this discussion only the flux vector $\Psi$ (magnitude $\psi$) in the rotor winding and the EMF vector e (magnitude e) in the rotor winding are considered for the description of flux and EMF of the machine. Only the component $i_{\phi 1}$ parallel to the flux vector $\psi$ contributes to the buildup of the magnetic field as magnetization current $i_\mu$, while the active current is given by the component $i_{100\ 2}$ of the stator current perpendicular to the flux vector. The stator current vector i and stator voltage vector u can be tapped at the machine terminals and be described by the components in a stator-related (i.e. fixed) coordinate system, e.g. a Cartesian fixed coordinate system designated by the indices $\alpha_1$, $\alpha_2$. With respect to the $\alpha_1$ axis, the stator current has the angle $\epsilon$, the time derivative of which is given by the stator frequency $\omega$. For the description of the asynchronous machine it is, however, advantageous to proceed from a field-oriented coordinate system which revolves with the flux vector $\psi$ and is given by an axis (index $\phi_1$) parallel to the flux vector and an axis $\phi_2$ perpendicular thereto. Accordingly, the field-oriented coordinate system is rotated relative to the stator reference system by an angle $\phi$ which is enclosed by the flux vector $\psi$ and the $\alpha_1$ axis. For the above-mentioned field-oriented operation of a frequency converter-fed asynchronous machine, therefore, the nominal values of the stator current are set in the field-oriented reference system, from which the corresponding nominal values for the stator current vector to be set in the fixed stator reference system must be determined. This requires information about the relative position between field-oriented reference system and stator reference system (i.e. the angle $\phi$).

The EMF vector e can be calculated from the stator-related coordinates (tapped on the machine) of the stator current vector i and of the stator voltage vector u according to the equation $$e = u - i \cdot r^s - x^\sigma \cdot d/dt\, i \qquad (1)$$

By integration of this EMF vector the flux vector $$\psi = \int e\, dt \qquad (1a)$$

can be formed. Since for field-oriented control frequently only the information about the direction of the flux vector is needed, and since in the stationary case the flux vector and EMF vector are perpendicular to each other, one can perform instead of the integration a rotation of the EMF vector by 90°, or the direction of the EMF vector itself can be used. For the control as described e.g. in U.S. Pat. No. 3,824,437 (which corresponds to German Patent DE PS No. 19 41 312), therefore, any EMF former is required, in which the stator voltage vector and the stator current vector as well as the parameter values for the stator resistance $r^s$ and the stray inductance $x^\sigma$ are entered. The quality of this control depends on the exact setting of the parameters $r^s$, $x^\sigma$.

In another method for flux determination one proceeds, not from the induced EMF, but from the processes leading to the formation of the field in the rotary field machine. In connection with this invention, the following relationships are important:

With the relationships illustrated in FIG. 1, the component, parallel to the flux vector $\psi$, of the stator current vector i is found to be $$i_{\phi 1} = i\cos(\epsilon - \phi).$$

In the stationary case this component equals the magnetization current $i_\mu$; in dynamic states the magnetization current in the machine builds up with a time behavior which, using the Laplace operator S and the time constant T, can be written thus:

$$i_\mu = i_{\phi 1}\, 1/1 + ST \qquad (2)$$

The field produced in the rotor by this magnetization current is described by a flux vector $$\psi = i_\mu \cdot x^h \qquad (3)$$

which induces in the rotor an EMF given by $$e = d/dt\, \Psi \qquad (3a)$$

In stationary form the differentiation can be represented by a rotation by 90° and multiplication by the angular velocity $\omega$ of the stator current vector, so that we have for the vector magnitudes:

$$e = i_\mu \cdot x^h \cdot \omega$$

As the magnetization current $i_\mu$ is equal to the field-parallel stator current component $i_{\phi 1}$ only in the stationary case, this stator current component parallel to the flux vector $\psi$ is called the "magnetization current component." The parameter value for the main inductance $x^h$ of the machine is an important determining factor.

Since the parameters vary (e.g. $r^s$ due to thermal heating and $x^h$ due to saturation during operation of the asynchronous machine), it is necessary for an exact field-oriented control, to determine the parameter values belonging to the individual operation states.

Several proposals, not published with a prior date, have been made to use the two equations (1) and (3) for the determination of a parameter value, by calculating vector e or the respective flux vector $\psi$ in two ways which depend on the set parameter values. If one considers a determinant of the vectors calculated in different ways (e.g. the magnitude or a component parallel or perpendicular to the stator current) there results a difference between these determinants which depends on the accuracy of the parameter values used. By supplying this difference between the determinants to an integrating regulator and adjusting according to the regulator output signal the parameter value for the machine parameter to be determined, therefore, one can achieve, by balancing of the two vectors calculated in different ways, an adjustment of the parameter value used to the machine parameters to be determined.

In these non-predated proposals, the vector e or $\psi$ is determined in one instance according to equation (1) via an EMF former. The other method for the calculation of $\psi$ or e consists, according to one proposal, of an arithmetic model circuit which, on the basis of the actual machine currents and the rotor position as well as a variable parameter value for the rotor resistance, calculates a model flux vector or respectively a model EMF vector. Since the actual stator current vector is impressed on the computation model circuit, identical circle diagrams for $\psi$ or e apply, although the slip scaling is different if the parameter value of the rotor resistance differs from the machine rotor resistance. Although the arithmetic model circuit works with the actual rotor position, the model vector differs from the vector determined in the EMF former if the setting of the parameter value for the rotor resistance is imprecise. Now this deviation can be used for readjusting the parameter value used in the model to the machine parameter. In another proposal, the model vector is calculated in an arithmetic model circuit from the voltage vector and the rotor angle. In this case the actual voltage vector is impressed on the computation model, coincident circle diagrams for e or $\psi$ applying here also, which differ only in the slip scaling according to the incorrect setting of the rotor resistance parameter value. For determining the stator resistance, in both cases the fact can be used that the EMF vector component parallel to the stator current vector (active component) differs from the corresponding component of a vector formed from the stator voltage vector simply by subtraction of the inductive stray voltage, only by the ohmic stator voltage drop. If therefore one uses for the follow-up of the rotor resistance parameter as determining quantity for the EMF vector and the model EMF vector the component perpendicular to the stator current vector, after completed balance the reactive components of the vector determined in the EMF former and of the model vector will differ only by the product of stator current and stator resistance.

In both proposals, the rotor angle is required as actual value, but this is often difficult or even impossible to realize technically.

SUMMARY OF THE INVENTION

It is therefore an object of the invention to provide an apparatus for determining the actual parameter values of at least one of the stator resistance, the stray inductance and the main inductance of an asynchronous machine, without information about the rotor position.

In accordance with the invention the parameter value is determined by apparatus that comprises an EMF-forming circuit, an arithmetic control circuit, an arithmetic model circuit, and a control circuit. In a balanced position of the control circuit the output signals of the control circuit represent the actual parameter values. The basic principle used in the invention makes it possible to determine selectively one of these parameter values, essentially with the use of the same structural elements. In particular it can be achieved by a minor expansion that one can change over from the determination of one parameter value to the determination of another parameter value with the same device. This is especially advantageous when all three machine parameters are not known. Since for an exact determination of one parameter value the other two machine parameters must be known, one obtains a converging method by starting with estimated values for all three parameter values and successively changing over to the determination of another parameter value, always using the last determined values of the other two parameters as improved estimated values.

According to the invention, the apparatus consists of
(a) an EMF-forming circuit for the formation of a correlated first vector,
(b) an arithmetic control circuit for the formation of a correlated magnetization component and of a determinant for the first vector,
(c) an arithmetic model circuit for the calculation of a flux belonging to the correlated magnetization current component, and
(d) a control circuit which calculates a determinant of a second vector correlated with this flux and which forms the control deviation of the determinants of the two vectors.

The EMF-forming circuit: From the values tapped at the machine inputs for the components $i_{\alpha 1}$, $i_{\alpha 2}$ of the stator current vector and the components $u_{\alpha 1}$, $u_{\alpha 2}$ of the stator voltage vector as well as from set parameter values $r^{s'}$ $x^{\sigma'}$ for the stator resistance $r^s$ and the stray inductance $x^{\sigma}$ ("true" machine parameters $r^s$, $x^{\sigma}$), the EMF forming circuit determines, as a first vector, a vector e' correlated with this parameter setting (components $e'_{\alpha 1}$, $e'_{\alpha 2}$) respectively $\psi'$ (components $\psi'_{\alpha 1}$, $\psi'_{\alpha 2}$) for the EMF or respectively the corresponding flux.

The arithmetic control circuit contains at least a vector analyzer and a vector transformer, e.g. a vector rotator such as described in U.S. Pat. No. 3,775,649. The vector analyzer calculates from the first vector an angle quantity determining the direction of this vector. The vector transformer calculates from the tapped components $i_{\alpha 1}$, $i_{\alpha 2}$ of the stator current vector and from the angle quantity as magnetization current component correlated with the parameter setting that stator current component which is perpendicular to the EMF vector e' correlated with the EMF-forming circuit (or respectively its parameter setting) or—this being equivalent because of the orthogonality of e' and $\psi'$—is parallel to the corresponding flux $\psi'$. Further there is calculated in the arithmetic model circuit an additional determinant of the first vector.

If $\epsilon$ and $\phi'$ are the angles between the $\alpha_1$ axis and the known stator current vector i or respectively the calculated flux vector $\psi'$, the position of the flux vector $\psi'$ is determined e.g. by the angle $\phi'$ or the angle $\phi' - \epsilon$; as angle quantity, therefore, a corresponding angle function can be calculated in the vector analyzer. Vector $\psi'$ is then determined only by one additional determinant, e.g. the vector magnitude $\psi'$, which also can be calculated by the vector analyzer, or by one of the quantities $\psi'_{j1} = \psi' \cos(\phi' - \epsilon)$ and $\psi'_{j2} = \psi' \sin(\phi' - \epsilon)$, which represent the components of the vector $\psi'$ in a coordinate system revolving with the stator current vector (current-oriented system) and can be derived from the outputs of the vector anlayzer. The same procedure can be followed when using as correlated first vector the EMF vector e' instead of the flux vector $\psi'$.

The correlated magnetization current component can be determined by converting in the vector transformer the fixed components of the stator current vector into the corresponding components in a coordinate system revolving with the vector $\psi'$ or respectively e' (flux-oriented coordinate system). While the true magnetization current component is given by the stator current component parallel to the true flux vector $\psi$, the here calculated magnetization current component $i'_{\phi 1}$ is likewise correlated with the parameter setting of the EMF-forming circuit because of the orientation of the flux vector $\psi'$ belonging to the parameter setting of the EMF-forming circuit.

The arithmetic model circuit calculates from the magnetization current component $i'_{\phi 1}$ developed by the arithmetic control circuit and from a set parameter value $x^{h'}$ for the main field inductance of the machine, by mathematical simulation of the processes leading to the production of the field, a flux correlated with the set main field inductance parameter $x^{h'}$ (magnitude $\psi''$ of a flux vector $\psi''$). In contrast to the known proposals, the computation model circuit does not require information about the rotor position, so that e.g. an angle pulse transmitter for the rotor position input is obviated. Only the input of the stator current revolution frequency (stator frequency) is provided at other points of the device according to the invention when a quantity revolving practically at the stator frequency is being differentiated or integrated, e.g. in order to change over from flux to EMF or vice versa. Under stationary conditions, such a differentiation or integration can then be effected simply by multiplication or division by the stator frequency.

The control circuit determines firstly a determinant—corresponding to the determinant of the first vector—of a second vector correlated with the arithmetic model circuit, which second vector is derivable from the flux $\psi''$ determined in the arithmetic model circuit. As determinant of this second vector one can use in particular the flux $\psi''$ directly when the flux magnitude $\psi'$ had been used as determinant of the first vector. It is therefore not necessary to determine the second vector $\psi''$ itself. Provided that as a determinant of the first vector the magnitude e' of the EMF vector was used, one can use as determinant of the second vector in the stationary case the product of flux $\psi''$ and stator frequency, which indicates the magnitude of an EMF vector e'' belonging to flux $\psi''$ without having to calculate this second vector e'' itself. But if in the computer a stator current-oriented coordinate of $\psi'$ or e' has been calculated as determinant of the first vector, one uses as corresponding determinant of the second vector the same stator current-oriented component of vector $\psi''$ or e''. Here it can be utilized that there belongs to the magnetization current component entered in the computation model circuit a vector $\psi''$ or e'' whose direction is given by the same angle quantity as the vector $\psi'$ or e'. The difference between the two determinants is entered in an integrating regulator in the control circuit. Its output signal is supplied to the input for setting the found parameter value, that is, to an input for the stator resistance parameter value $r^s$ or respectively the stray inductance parameter value $x^h$ at the arithmetic model circuit. In the balanced state the output signal of the controller represents the parameter value to be determined.

BRIEF DESCRIPTION OF THE DRAWINGS

The invention will be further explained with reference to the accompanying drawings, in which.

DESCRIPTION OF THE PREFERRED EMBODIMENT

Figure 1:
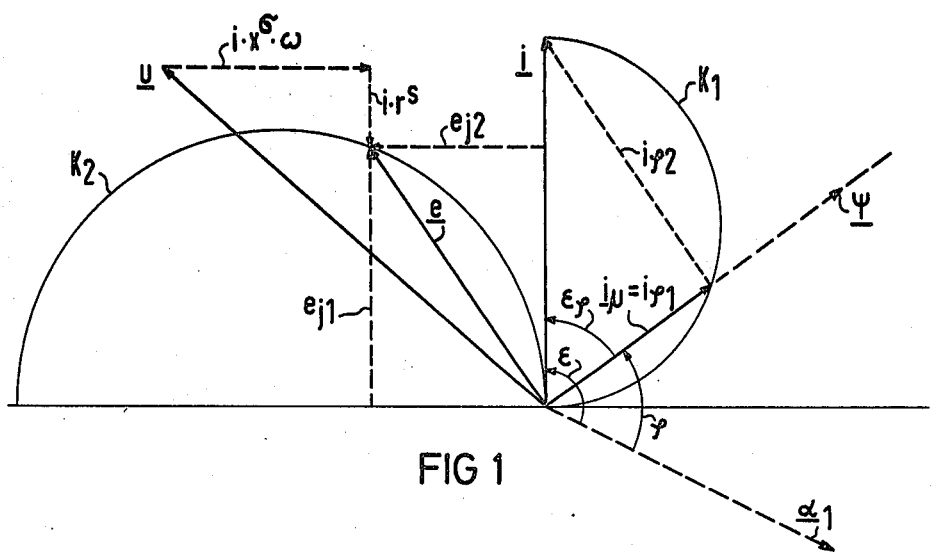
FIG. 1 shows a vector diagram for the description of an asynchronous machine.

If the stator currents and stator voltages of an asynchronous machine are combined as a stator current vector i and stator voltage vector u, these vectors can be described by their magnitude and the angle which they enclose e.g. with a stator axis which is shown in FIG. 1 as reference axis $\alpha_1$ of a stator-oriented (fixed) reference system. Preferably there are formed from the measured values for the stator current and stator voltage at the three stator windings of a three-phase asynchronous machine, by means of a coordinate transformer, the projections onto the two axes of a Cartesian fixed reference system. If, therefore, the revolving vector i of the stator current describes the angle $\epsilon$ with the $\alpha_1$ axis, its stator-related Cartesian components are given by $i_{\alpha 1} = i \times \cos \epsilon$, $i_{\alpha 2} = i \times \sin \epsilon$. In the stationary state shown in FIG. 1, the stray voltage drop $d/dt \; i \; x^\sigma$ is given by a vector of the length $i \; x^\sigma \omega$ perpendicular to the vector i, where $\omega = d\epsilon/dt$ is the rotational frequency of the stator current. The ohmic voltage drop is a pure active current drop and thus directed opposite to vector i, and it has the magnitude i $r^s$.

Consequently there results according to equation (1) the EMF of the rotor as a vector e which is determined as to magnitude and length according to FIG. 1. Responsible for the build-up of the field is the magnetization current $i_\mu$ pointing in $\psi$ direction, which in the stationary case is equal to the stator current component $i_{\phi 1}$ parallel to $\psi$. In the stationary state, the length of the flux vector $\psi$ pointing in the direction of the magnetization current is proportional to $i_{\phi 1}$, whose end point lies on a semicircle $K_1$ over the stator current vector i and moves on this semicircle according to the load of the machine. This follows from the fact that the active current determining for the torque is perpendicular to the magnetization current.

For the further analysis it is advantageous to describe the stator current in a Cartesian coordinate system which is rotated relative to the stator axis by the flux angle $\phi$, by the two components $i_{\phi 1}$ (which under stationary conditions changes over to the magnetization current $i_\mu$), and by $i_{\phi 2}$ (active current). In the considered stationary case, the EMF vector e is rotated 90° relative to the flux vector $\psi$; because of the proportionality between e and $\psi$, therefore, the end point of the vector e also lies on a semicircle ($K_2$). This construction of the vectors e, $\psi$ thus proceeds, according to equation (1), from the vector u and the parameters $r^s$ and $x^\sigma$.

However, also equations (2) and (3) or (3a) must be fulfilled. Therefore, it is possible also, starting from the vector i and the parameter $x^h$, to determine the vectors e and $\psi$ respectively. Both methods must lead to the same vector e, respectively $\psi$. As these are plane vectors which have two determinants (e.g. magnitude e and angle $\epsilon_\phi$ for the vector e), both methods must lead to the same value for a determinant of this vector.

Further, in FIG. 1 $e_{j1}$ represents the component parallel to the stator current, and $e_{j2}$ the component perpendicular thereto. There applies $e_{j1} = e \sin \epsilon_\phi$, $e_{j2} = e \cos \epsilon_\phi$ (current-oriented component). Hence if the angle $\epsilon_\phi$ is known, the vector e has an additional determinant, for which e, $e_{j1}$ or $e_{j2}$ can be used. The same is true for the flux vector $\psi$.

Now the invention is based on the following reasoning:

By using estimated values $r^{s\prime}$, $x^{\sigma\prime}$ for the construction of the EMF vector from the stator voltage vector, a vector e′ will be determined which differs considerably from the real EMF vector e. Now by forming instead of the projection of the stator current i on the real flux vector $\psi$ the projection on a vector perpendicular to the estimated vector e′, one obtains an estimated magnetization current component $i'_{\phi 1}$ likewise lying on the circle $K_1$. By using this estimated magnetization current component as input magnitude for an arithmetic model circuit simulating the asynchronous machine (e.g. according to equations 2 and 3), one obtains a second estimated EMF vector e″ which differs from the first estimated EMF vector e′. Analogously, instead of the EMF vectors e′, and e″ the corresponding flux vectors $\psi'$, $\psi''$ may be used.

Now if two of the three considered parameters are known accurately enough, the setting of the third parameter can be varied until the two estimated vectors coincide.

Determination of $r^s$

Figure 2:
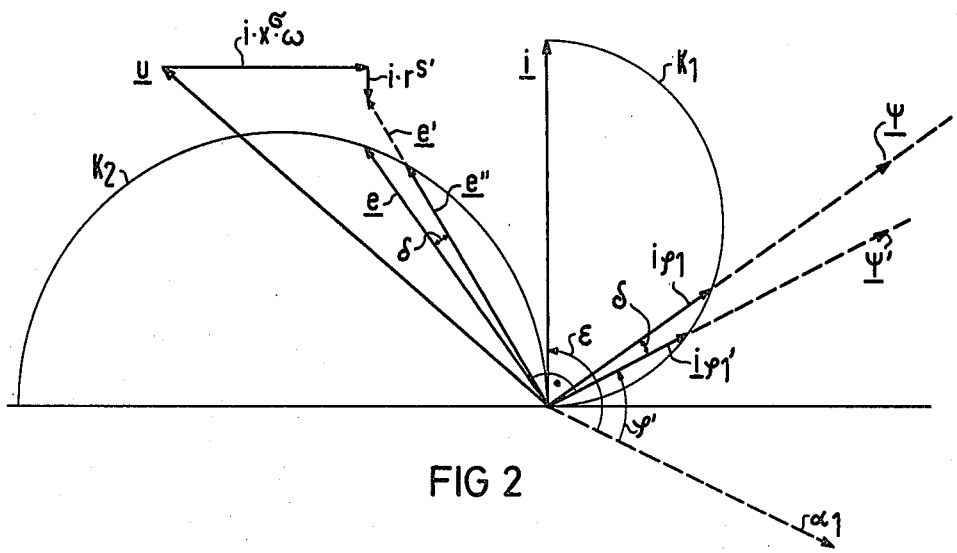
FIGS. 2 to 4 show the vector diagrams of the asynchronous machine and of the arithmetic model circuit where only the parameter value for the stator resistance, the stray inductance, or the main field inductance differs from the corresponding machine parameter.

In FIG. 2 are shown the conditions for the case that the parameter values for $x^\sigma$ and $x^h$ are sufficiently known, but for the EMF formation according to equation (1) an estimated parameter value $r^{s\prime}$ is used which is smaller than actual stator resistance $r^s$. Hence the correlated EMF vector e′ points to a point outside the circle $K_2$. By $\Delta$ is designated the angle between e′ and e. To this estimated EMF vector e′ belongs a flux vector $\psi'$ which likewise differs from the true flux vector $\psi$ by the angle $\Delta$. As estimated magnetization current component $i'_{\phi 1}$ there is now formed the projection $i'_{\phi 1}$ of the true stator current vector i onto a unit vector pointing in the direction of $\psi''$, with respect to which the arithmetic model circuit forms a second estimated EMF vector e″ according to equation (3). There applies for the magnitudes of these EMF vectors $e' - e'' < 0$ when $r^{s\prime} - r^s < 0$. Consequently, the difference $e' - e''$ can be supplied to an integrating regulator which automatically follows up the estimated value $r^{s\prime}$ until at coincidence of the vectors e′ and e″ the difference between the magnitudes disappears.

For the projections (not marked in FIG. 2) of the vectors onto a unit vector parallel or perpendicular to the stator current vector i (current-oriented coordinates $e'_{j1}$, $e'_{j2}$) always the same dependence of $r^{s\prime} - r^s$ applies. Therefore one can use as determinants also a stator current-oriented component of each of the vectors e′, e″ for the control.

In FIG. 2, operation as motor is considered, which is characterized by the condition $i_{\phi 2} > 0$ or $m = i_{\phi 2}/i_{\phi 1} > 0$. For operation as generator the sign of the difference $e' - e''$ is reversed. Consequently the control sense of the control circuit must be switched in operation as generator. As switching criterion may be used the sign of the quotient $m = i'_{\phi 2}/i'_{\phi 1}$ or respectively the sign of $i'_{\phi 2}$.

Only in idling (m approx. 0) difficulties arise, so that it is best not to make any $r^s$ determination in these ranges.

If the parameter values $x^\sigma$ and $x^h$, which until now were assumed to be known with sufficient accuracy, are themselves only imprecise estimations, it is found that with increasing stator frequency $\omega$ the stator resistance is determined in this manner with increasing imprecision. For this reason it is advantageous to determine the stator resistance only in the lower frequency range. If the rotor resistance found in this lower frequency range is used for a field-oriented control of an asynchronous machine, this does not cause a substantial falsification of the control since for field-oriented control the stator resistance need be set accurately only at frequencies which are small in relation to the nominal frequency $\omega_{nenn}$ (e.g. $\omega/\omega_{nenn} < 0.1$).

Determination of $x^\sigma$

Figure 3:
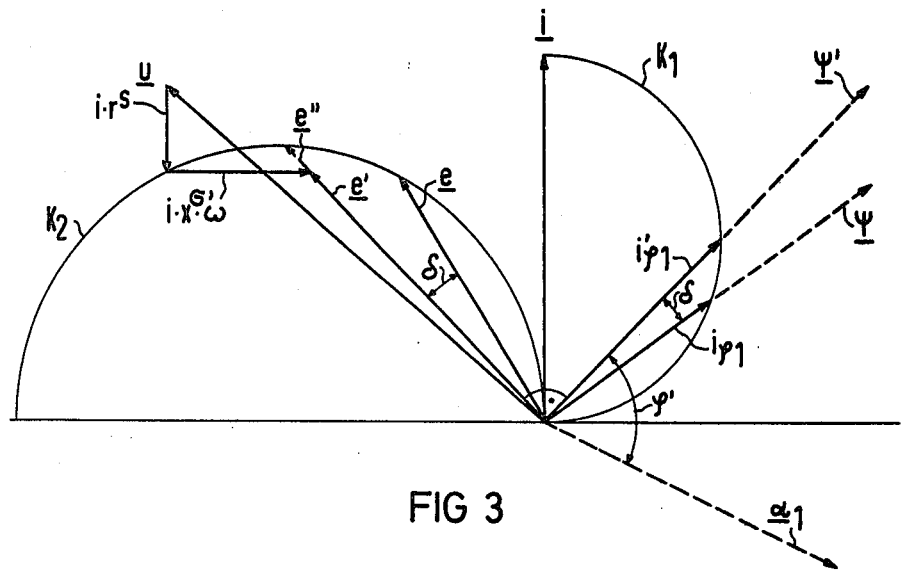

In FIG. 3 it is assumed that the values for $r^s$ and $x^h$ are known accurately enough, but that for the stray inductance $x^\sigma$ an inaccurate estimated value $x^{\sigma\prime}$ is used. For $x^{\sigma\prime} < x^\sigma$ there then results according to equation (1) an estimated EMF vector e′ whose end point lies, if the angle between EMF vector and stator current vector is less than 45°, within the circle $K_2$ and is displaced relative to the true EMF vector e by the angle $\Delta$. Accordingly also the respective estimated flux direction is changed by the angle $\Delta$ relative to the direction of the flux vector $\psi$, so that there results the estimated magnetization current component $i'_{\phi 1}$ differing from the true magnetization current component. According to equation (3) there belongs to this the second estimated EMF vector e″, which differs from the vector e′. Here, too, there results a monotony between the deviation $r^{s'}-r^s$ and the difference of the vector magnitudes $e'-e''$ or respectively the difference of a stator current-oriented component of these vectors. Consequently this difference can be used also in this case to adjust the estimated parameter value $x^{\sigma'}$ estimated by means of an integrating regulator until for the case $e'=e''$ the estimated value $x^{\sigma'}$ equals the true stray inductance $x^\sigma$.

For the case that the angle between EMF and stator vector exceeds 45°, $e'-e''$ is greater than 0 if $x^{\sigma 1}-x^\sigma<0$. In this range, which likewise is given by a condition for the quotient $m=i'_{\phi 2}/i'_{\phi 1}$, namely $m>1$ or the condition $k'_{\phi 2}<i'_{\phi 1}$, it is therefore necessary to switch the control sense of the control arrangement. For the range m approx. equals 1 difficulties result, so that in this range the device advantageously remains switched off.

It is found that an imprecise input of the parameters $r^s$ and $x^{h'}$ in the vicinity of idling can lead to greater mis-determinations for $x^\sigma$. This mis-determination, however, will be the smaller as the load of the machine is greater, i.e. the more the quotient m exceeds the value 1. The method is therefore to be used advantageously mainly at high frequencies and large values for the quotient m.

Determination of $x^h$

Figure 4:
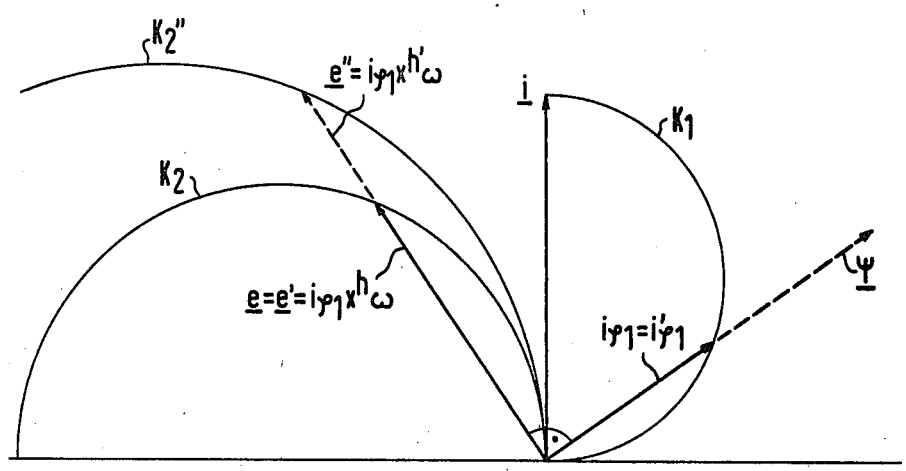

In the special case that the parameter values $x^\sigma$ and $r^2$ are known exactly and there is an imprecise estimated value only for the main inductances $x^h$, the EMF forming circuit determines as EMF vector $e'$ the actual EMF vector e of the machine (FIG. 4). And therefore the directions of the associated flux vectors $\psi$ and $\psi'$ and hence also the magnetization current components $i_{\phi 1}$ and $i'_{100\ 1}$ coincide. The arithmetic model circuit, however, determines an estimated value $e''$ for the EMF vector, which because of the orthogonality with $\psi=\psi'$ has indeed the direction of the vector $e=e'$, but has a different magnitude $e''$ and whose end points therefore lie on a circle $K_2''$ corresponding to the load. The diameter of this circle depends on the parameter $x^{h'}$. Therefore the relationship between the magnitude difference $e''$ and $e'$ and the estimated value deviation $x^{h'}-x^h$ of the parameter $x^h$ is a monotonous one, and here too one can use for the adjustment of the parameter $x^h$ the difference between a determinant of vector $e'$ and a corresponding determinant of vector $e''$.

If the values $x^\sigma$ and $r^s$ are known only imprecisely, there results a mis-determination for the parameter value $x^h$ which is small at higher frequencies, in particular $\omega/\omega_{nenn}>0.5$ at idling (m=0) and becomes greater only at higher load (m>1). The determination of $x^h$ by this method is therefore advantageously carried out at higher stator frequencies and low machine loads.

Since the determination of each individual parameter value amounts in the last analysis to a comparison of the vectors $e'$ and $e''$, the same EMF-forming circuit and the same arithmetic circuit can be used for the formation of the balance of the determinants required for the respective adjustment of a parameter value. For the determination of $x^h$ there is provided at the computation model circuit an input at which an estimated value for this parameter can be entered. Correspondingly the EMF-forming circuit contains a setting input for the parameter $x^{\sigma'}$ and the parameter $r^{s'}$, respectively. To each parameter value to be determined its own integrating regulator is assigned, whose output is connected with the setting input of the associated parameter value. Advantageously each integrating regulator can be adjusted to the initial conditions for the control operation (control integration). To avoid mutual interference of the balancing methods for different parameter values, the controllers are released preferably only at different times, in particular in different operational states. If we define the load of the asynchronous machine by the tangent of the angle between the stator current vector and the flux vector or by approximation by the quotient $m=i'\phi_2/i'\phi_1$, these being the stator current components perpendicular and parallel to the vector $e'$ determined in the EMF-forming circuit, we can define the operating states in which one of the parameter values is determined from each other in such a way that at low stator frequencies and higher load the stator resistance is calculated; at higher frequencies and near idling, the principal inductance; and at higher frequencies and higher loads, the stray inductance.

Figure 6:
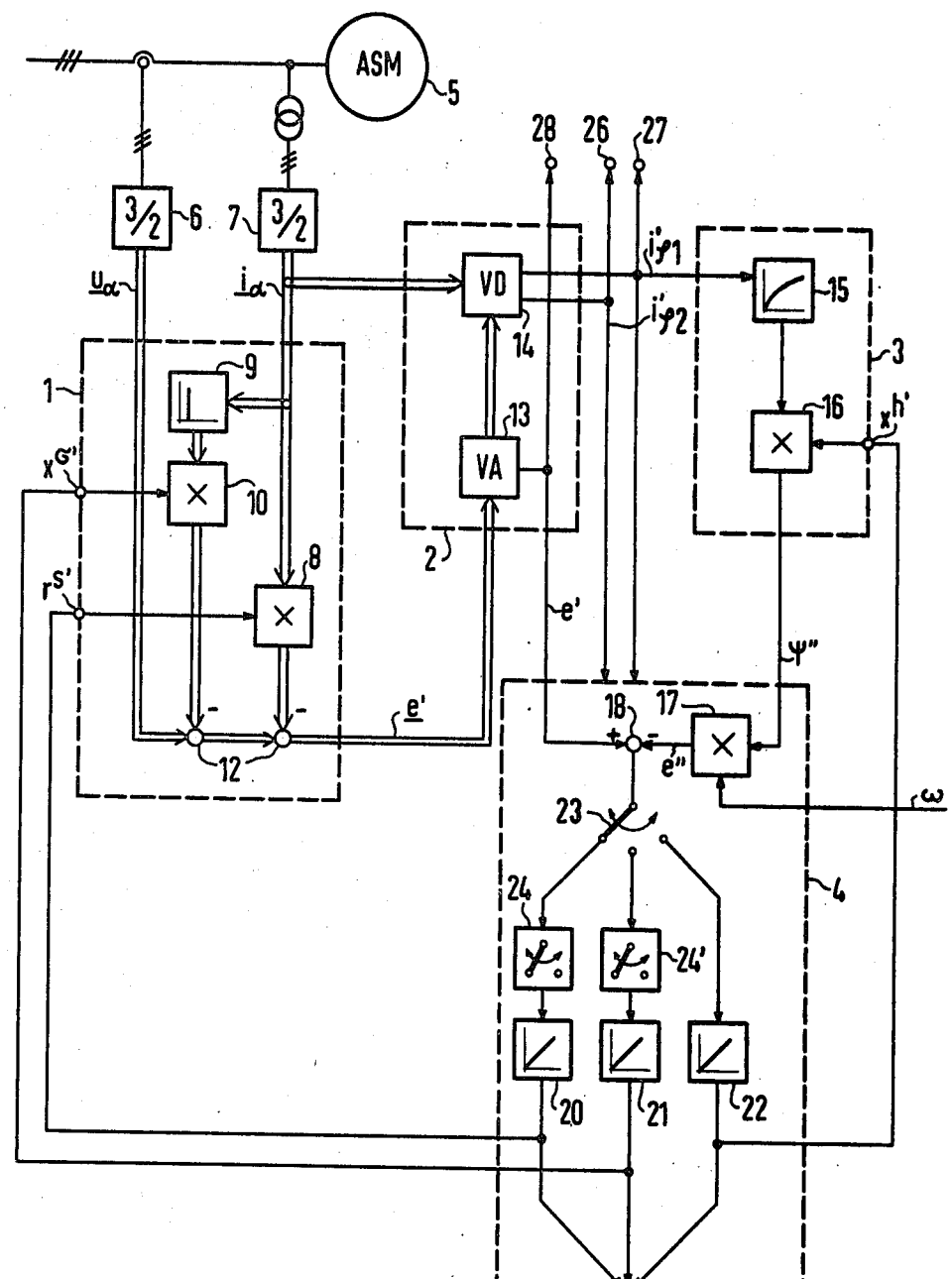
FIG. 6 schematically shows an apparatus for the selective determination of one of the three parameter values, using as determinants the magnitude of the EMF vectors e' and e''.

FIG. 6 shows schematically a complete arrangement for the determination of all three parameter values. The arrangement consists of the EMF-forming circuit 1, the computer 2, the computation model circuit 3, and the controller stage 4. At the input terminals of a three-pole asynchronous machine 5 are tapped the stator voltages and stator currents which in appropriate coordinate transformers 6, 7 such as described in U.S. Pat. No. 3,775,649 are combined as vector magnitudes pointing into the direction of the axis of the respective stator windings to form a vector $u_\alpha$ and $i_\alpha$ respectively. For simplified representation a vector is marked in the figures by a double arrow, which is to indicate that these are the components of a vector in a Cartesian coordinate system, where the respective computing operations marked at the respective computer elements by the switching symbols are to be carried out component by component. In the EMF-forming circuit 1, the vector $r^{s'} \times i_\alpha$ of the ohmic stator voltage drop is formed by multiplication (multiplication member 8) of the set parameter values $r^{s'}$ by the stator-related component-tapped at the coordinate transformer 7—of the stator current vector $i_\alpha$. Likewise, by componentwise differentiation (differentiation member 9) and multiplication by a set parameter value $x^{\sigma'}$ for the stray inductance (multiplication member 10), the vector of the inductive stray voltage can be formed. In a subtraction circuit 12, the vector $e'$ ("first vector") of the EMF correlated with the set values $x^{\sigma'}$, $r^{s'}$ is formed from the components-tapped at the coordinate transformer 6—of the stator-related stator voltage vector $u_\alpha$.

For the field-oriented control of an asynchronous machine a similar arrangement is required anyway as flux detector to determine the direction of the magnetic field of the asynchronous machine. Such detectors contain also, as a rule, an integrator for determining the flux vector belonging to the EMF vector, by componentwise integration. The deduction of the inductive stray voltage can here be effected by first integrating only the difference $u_{60}-r^s \times i_\alpha$ and then forming the stray voltage drop by subtraction of the vector $x^\sigma \times i_\alpha$. Also such a flux detector can be used as EMF-forming circuit in the apparatus according to the invention, in which case there is formed, instead of the vector $e'$, the respective flux vector $\psi'$ as the first vector correlated with the set parameters $x^{\sigma'}$, $r^{s'}$.

The arithmetic control circuit, well-known in the art and described, for example, in U.S. Pat. No. 3,775,649 comprises at least one vector analyzer and a transformation circuit. The vector analyzer 13 determines from the vector $e'$ entered by the EMF-forming circuit, on the one hand, a correlated quantity determining this vector, in this case the magnitude $e'$ of vector $e'$, and an angle quantity. With this angle quantity the transformation circuit, which in this case is designed as a vector rotator 14, calculates from the stator-related components of the stator current vector $i_\alpha$ the component $i_{\phi 1}$ perpendicular to vector $e'$ (that is, parallel to the flux vector $\psi'$) and the component $i'_{\psi 2}$ perpendicular thereto. The stator-oriented given vector $i_\alpha$ is thus transformed into a coordinate system revolving with the first vector $e'$ and rotated by the angle $(\phi' + \pi/2)$.

In the arithmetic model circuit 3, a flux $\psi''$ is determined from the stator current component $i'_{\phi 1}$ parallel to $\psi'$ (correlated magnetization current component) and a set parameter value $x^{h'}$ for the main inductance of the asynchronous machine by mathematical simulation of the processes leading to the production of the magnetic field, which flux $\psi''$ is now correlated with the set main inductance parameter $x^{h'}$. Advantageously this calculation of the flux $\psi''$ takes place in that $i'_{100\ 1}$ is supplied to a filter designed as a smoothing member 15 for the formation of the magnetization current $i_\mu'$ according to equation (2) thereafter to a multiplication member 16 whose multiplier is given by a set (e.g. estimated) parameter value $x^{h'}$ for the main field inductance. The smoothing member 15 here simulates the dynamics with which the field builds up in the asynchronous machine. In the ideal case, the time constant of the filter 15 corresponds to the main field time constant of the asynchronous machine, which is given by the quotient of main inductance and rotor resistance. But since the determination of the parameter values can be effected practically in stationary processes, an exact setting of the time constants of the filter 15 (first order delay member) is not necessary; it suffices to set the time constant for example to a range of from 0.5 to 1 sec.

The essence of the field-oriented control consists in that the flux and the torque can be controlled by independent nominal values for the field-parallel and field-perpendicular portions of the stator current. The corresponding actual values of the stator current can therefore be obtained in that the components $i'_{\phi 1}$ and $i'_{\phi 2}$, which in the balanced state, in which the parameter values $x^\sigma$ and $r^{s'}$ are equal to the true machine parameters, are tapped from outputs 26 and 27 from the arithmetic control circuit 2, in order thus to obtain the required information about the direction of the flux vector. In like manner, the magnitude $e'$ can be tapped from output 28 as actual value, to obtain an actual value for the respective flux. A separate EMF detector for the control is thereby economized. Determination of the true machine parameters, which can be tapped at an output 29, is not necessary for the field orientation proper.

From the flux $\psi''$ associated with the arithmetic model circuit 3 there is determined in the control circuit 4 first a quantity $e''$ which is used as determinant of an EMF vector associated with the arithmetic model circuit in the same manner as the quantity $e'$ tapped at the vector analyzer serves as determinant of the vector $e'$. To this end the fact that the EMF belonging to flux $\psi''$ can be formed by differentiation of the flux vector can be utilized. In the quasi-stationary state, the flux vector belonging to the flux magnitude $\psi''$ revolves practically at the stator frequency, so that rather than determining the vectors $\psi''$ and $e''$, the sought EMF magnitude can be formed by multiplication (multiplier 17) of the flux magnitude $\psi''$ by the stator frequency $\omega$. The difference $e' - e''$ obtained in this way at the summation circuit 18 is now used as control deviation in order to follow up by means of an integrating regulator one of the set parameter values $x^{h'}$, $x^{\sigma'}$, $r^{s'}$ until the deviation disappears. The vector $e'$ and the corresponding vector $e''$, of which only its magnitude was calculated, will then be coincident. If the other two parameter values are in sufficiently exact agreement with the corresponding machine parameters, then also the value available at the control circuit output, of the parameter to be followed up, is in agreement with the corresponding machine parameter.

In the circuit according to FIG. 6, the difference $e' - e''$ can selectively be used for the following up of one of the parameters, a separate controller 20, 21, 22 being provided for each parameter value. The control deviation $e' - e''$ is added by a switching device 23 to the integrating regulator associated with the respective parameter value to be determined. Since, as has been explained before, the control sense is switched for certain values of the quantity $m = 1'_{\phi 2}/i'_{\phi 1}$, the controllers 20 and 21 are preceded by appropriate switching devices 24, 24' for sign reversal of the controller input signal. By 29 lastly an output is designated at which, after a control adjustment, the sought parameter value, e.g. $r^s = r^{s'}$, can be tapped.

Figure 7:
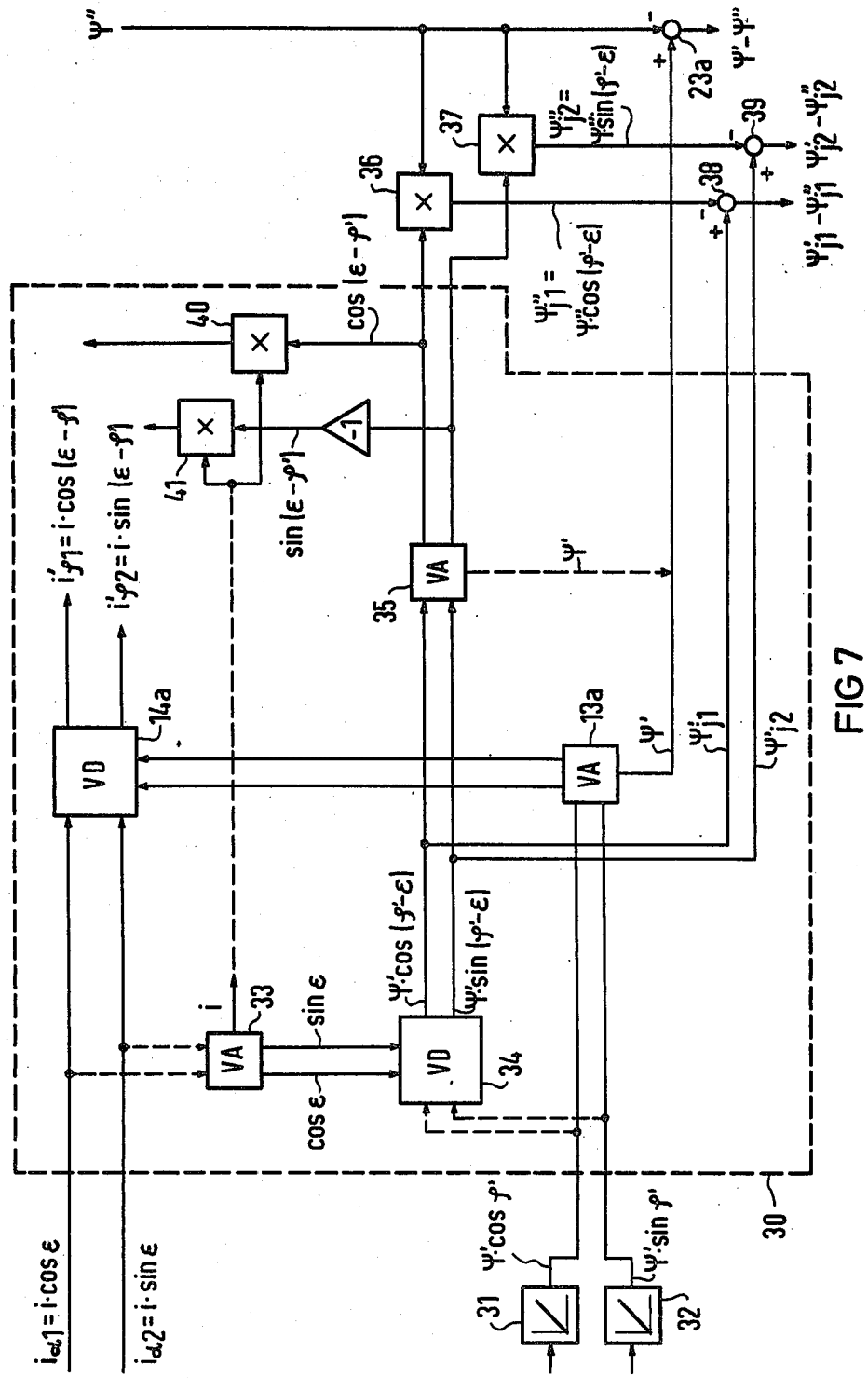
FIG. 7 shows various embodiments of an arithmetic control circuit usable when the determinants are formed from the flux vectors $\psi'$, $\psi''$.

As has been mentioned before, instead of the EMF vector $e'$, the respective flux vector $\psi'$ can be determined by the EMF-forming circuit. In this case the formation of the EMF magnitude $e''$ in the control circuit is obsolete and instead the flux $\psi''$ determined in the arithmetic model circuit is used directly as quantity correlated with the arithmetic model circuit. FIG. 7 shows a computer 30 for this case which corresponds to the arithmetic control circuit 2.

In the arithmetic control circuit are entered the components $i_{\alpha 1}$, $i_{\alpha 2}$ of the stator current vector, which are given with the angle designations from FIG. 1 by $i_{\alpha 1} = i \cos \epsilon$, $i_{\alpha 2} = i \sin \epsilon$ in the stator reference system. By the integrators 31, 32 it is indicated that as further input quantities for computer 30 there are entered instead of the EMF vector $e'$ the stator-related coordinates $\psi' \cos \phi'$ and $\psi' \sin \phi'$ of the flux vector $\psi' = \int e'\ dt$. By $\phi'$ is designated, in analogy to the flux angle $\phi$ from FIG. 1, the angle between the axis of the respective flux vector $\phi'$ and the $\alpha_1$ axis. The vector analyzer 13 of FIG. 6 here has its equivalent in the vector analyzer 13a, which on the one hand determines the magnitude $\psi'$ as the determinant, and on the other hand adds the angle quantities $\sin \phi'$, $\cos \phi'$ to a vector rotator 14a which, like the vector rotator 14 in FIG. 6, forms from the coordinates $i \cos \epsilon$, $i \sin \epsilon$ the corresponding field-oriented coordinates $i'_{\phi 1} = \cos (\epsilon - \phi')$, $i'_{\phi 2} = 1 \sin (\epsilon - \phi')$ referred to the vector $\psi'$. As characteristic determinant correlated with the arithmetic model circuit there is used, as mentioned before, directly the flux magnitude $\psi''$, so that in the control stage, at the appropriate subtraction point 23a, the difference $\psi' - \psi''$ can be formed.

In FIG. 7 is shown a further possibility for the formation of a quantity determining the vector $\psi''$. This possibility consists in that there can be formed in a vector analyzer 33 first the stator current magnitude $i$ and the angle quantities $\cos \epsilon$, $\sin \epsilon$ from the stator-related components of the stator current vector. These angle quantities are added to a vector rotator 34 which forms the stator current-related components $\psi'' \cos (\phi' - \epsilon)$, $\psi'' \sin (\phi' - \epsilon)$ from the stator-slated components $\psi i \cos \phi'$, $\psi' \sin \phi'$ by a rotation of the coordinate system in which the $\alpha_1$ axis of the stator reference system is rotated by the angle $\epsilon$ into the direction of the stator current vector. Now in this variant, instead of the vector magnitude $\Psi'$ as determinant there can be used selectively one of the two stator current-related coordinates. To this corresponds as determinant correlated with the arithmetic model circuit a corresponding stator current-related coordinate of the flux vector $\Psi''$. This vector $\Psi''$ is established as to magnitude by the flux magnitude $\psi''$ calculated in the arithmetic model circuit and as to direction by the direction of the magnetization current i'. For the formation of the stator current-oriented component of the vector $\Psi''$, therefore, it suffices to form by means of a vector analyzer 35 the corresponding angle quantity $\cos(\phi'-\epsilon)$ or respectively $\sin(\phi'-\epsilon)$ and to multiply it by the magnitude $\psi''$ (multiplier 36,37). The adjustment of a parameter value can now be effected by adjustment of the magnitude or of a stator-related component of the two vectors $\psi'$, $\psi''$. For this one uses the subtraction point 38 if the component perpendicular to the stator current is used, or the subtraction point 39 if the component parallel thereto is used, or the subtraction point 23a if the magnitude $\psi'$ is tapped at the vector analyzer 35 and compared directly with the flux $\psi''$ determined in the arithmetic model circuit.

Also in this circuit variant, the arithmetic circuit 30 must calculate by coordinate transformation the component of the stator current vector parallel to the flux vector, as magnetization current. Since the vector analyzer 35 already furnishes angle functions of the angle difference $\epsilon-\phi'$, the magnetization current can be formed by multiplication (multiplier 40) of the current magnitude i determined at the vector analyzer 35 by the angle quantity $\cos(\epsilon-\phi')$ determined at the vector analyzer 35. In this variant, therefore, the elements 13a, 14a can be economized. If also the quantity i' $\phi$2 is used for switching the control sense, this can likewise be done by multiplication of the stator current magnitude i by the angle function $\sin(\epsilon-\phi')=\sin(\phi'-\epsilon)$.

Figure 8:
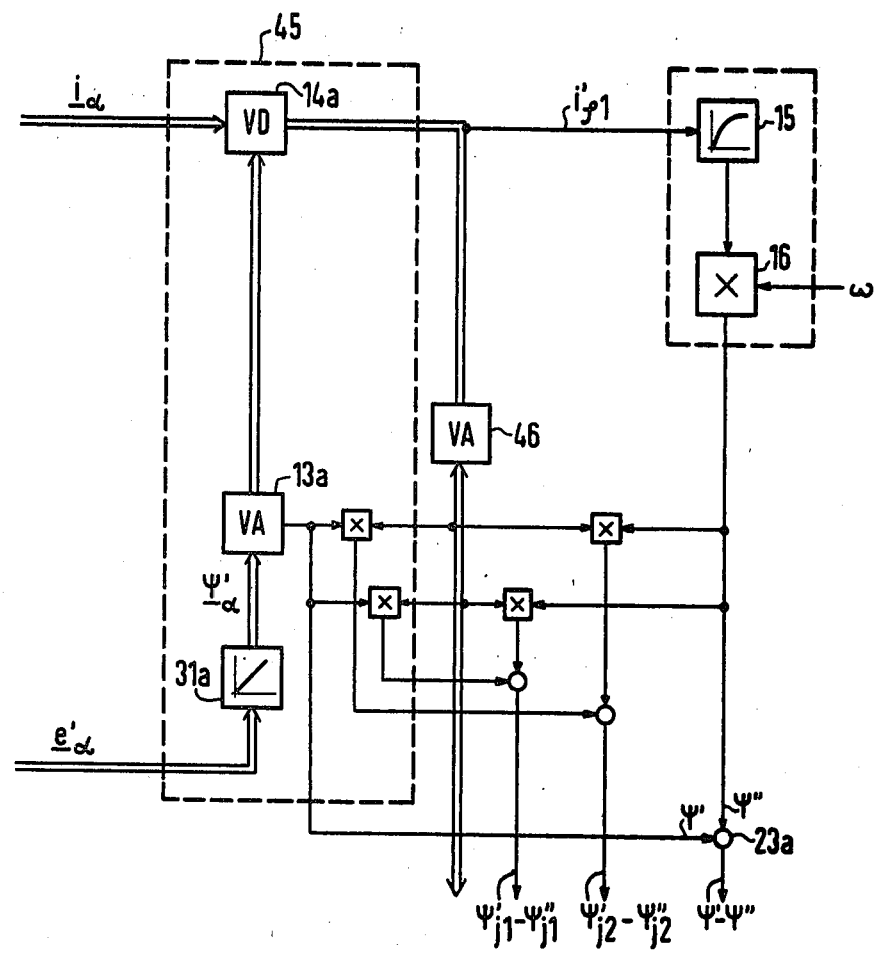
FIG. 8 shows an arithmetic control circuit and an arithmetic model circuit usable when the magnitudes of the flux vectors $\psi'$ and $\psi''$ or their current-oriented components are selected as determinants.

FIG. 8 shows an arithmetic circuit constructed according to the first variant with the vector analyzer 13a and the vector rotator 14a. By the integration stage 31a it is indicated that in arithmetic circuit 45 the flux vector $\psi'$ in the stator reference system (index $\alpha$) is produced by componentwise integration of the stator-related EMF components (index $\alpha$) of the vector e' associated with the parameter setting of the EMF forming circuit. In the stationary case, a counterclockwise rotation of the vector e' by 90° and if desired a division by the stator frequency can be used instead of the integration. The stator current vector is now transformed into a coordinate system revolving with the vector $\psi'$, in that the vector analyzer determines, in addition to the vector magnitude $\psi'$, angle quantities determining the angle of rotation with which the coordinate system for the stator current vector is aligned with the flux vector $\psi'$ in the vector rotator 14a. At the comparison point 23a there is calculated in the manner already described the control deviation $\psi'-\psi''$, if the flux magnitude is used as determinant. If, however, it is desired to use as determinant the component (index j1) parallel to the flux vector or the component perpendicular thereto (index j2) of the flux vectors $\psi'$ and $\psi''$, respectively, this can also be done in that, reversing the operation performed in FIG. 7 by means of the elements 32, 40 and 41, there is calculated by means of a vector analyzer 46 the cosine and sine of the angle $\phi'-\epsilon$ and there is formed by multiplication by the magnitudes $\psi'$ and $\psi''$ the corresponding control deviation $\psi'-\psi''=\psi' \cos(\phi'-\epsilon)-\psi'' \cos(\phi'-\epsilon)$ or respectively $\psi'_{j2}-\psi''_{j2}=\psi' \sin(\phi'-\epsilon)-\psi'' \sin(\phi'-\epsilon)$.

Figure 9:
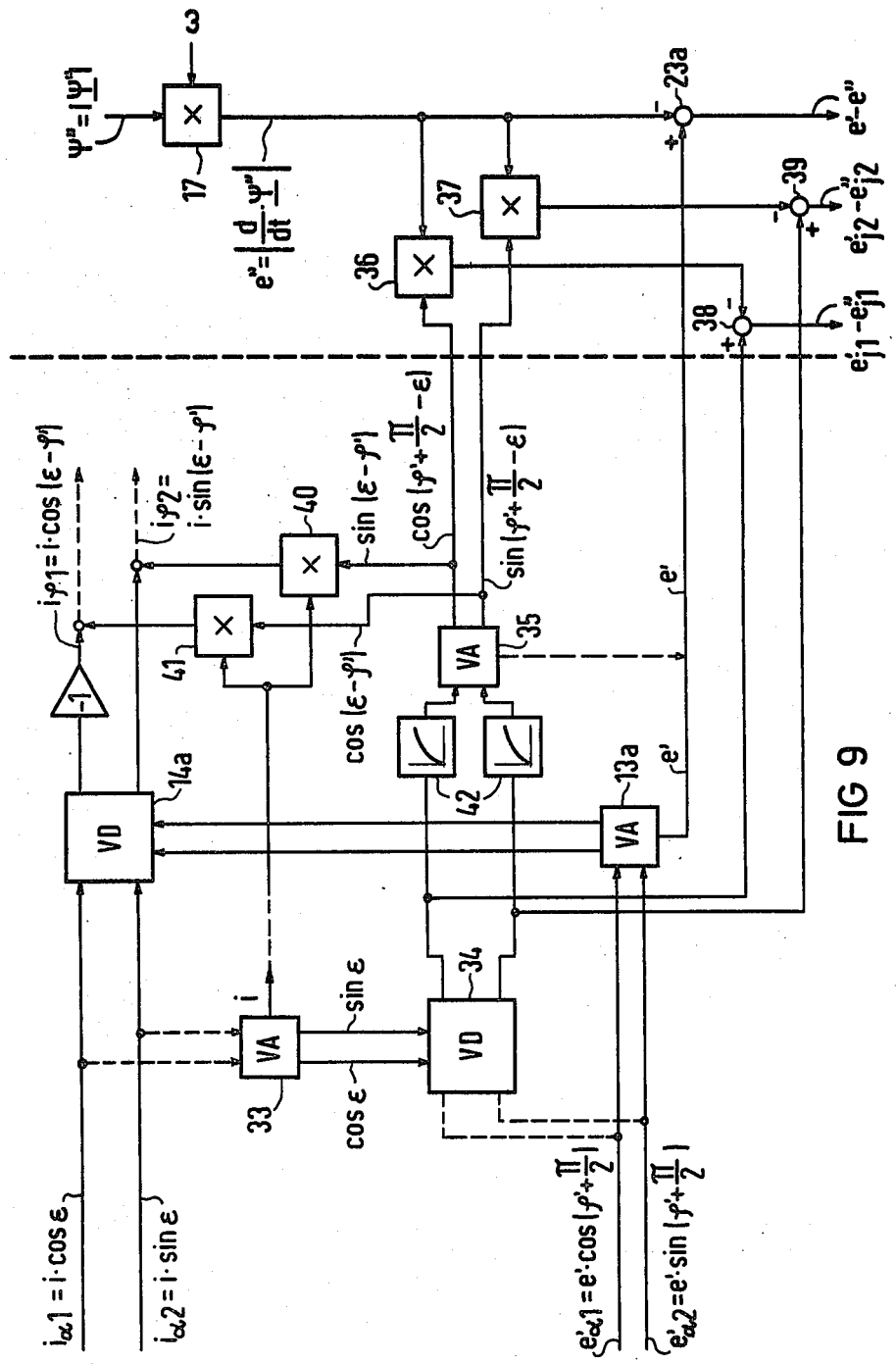
FIG. 9 corresponds to FIG. 7 usable when the determining quantities are derived from the EMF vectors e', e''.

FIG. 9 shows a circuit corresponding to FIG. 7, but where instead of the flux vector $\psi'$ the EMF vector e' is entered as the vector associated with the EMF forming circuit. The same structural parts are here provided with the same reference symbols. In the variant which uses the vector rotator 14a, the stator current is transformed in this case into a coordinate system revolving with the EMF vector. But since the EMF vector e' and the respective flux vector $\psi'$ are perpendicular to each other, this means essentially only that at the outputs of the vector rotator 14a the correlation of the components i'$\phi$1 and i'$\phi$2 is reversed.

Also in the circuit according to FIG. 9, the use of the elements 13a and 14a can be dispensed with when using the structural parts 33, 34, 35, 40 and 41. In contrast to FIG. 7, only the component inputs of the vector analyzer 35 are preceded by filters designed as smoothing members 42, to reduce the harmonics. As the output quantities of the vector rotator 34 are d-c voltages in the stationary case, these filters do not influence the phase or the magnitude of the fundamental oscillation that the input quantities have.

Since in this case the determinants for the EMF vectors are used, the EMF magnitude e'', too, is derived from the flux $\psi''$ calculated in the computation model circuit, for which purpose the multiplier 17 explained in connection with FIG. 6 is provided.

Figure 10:
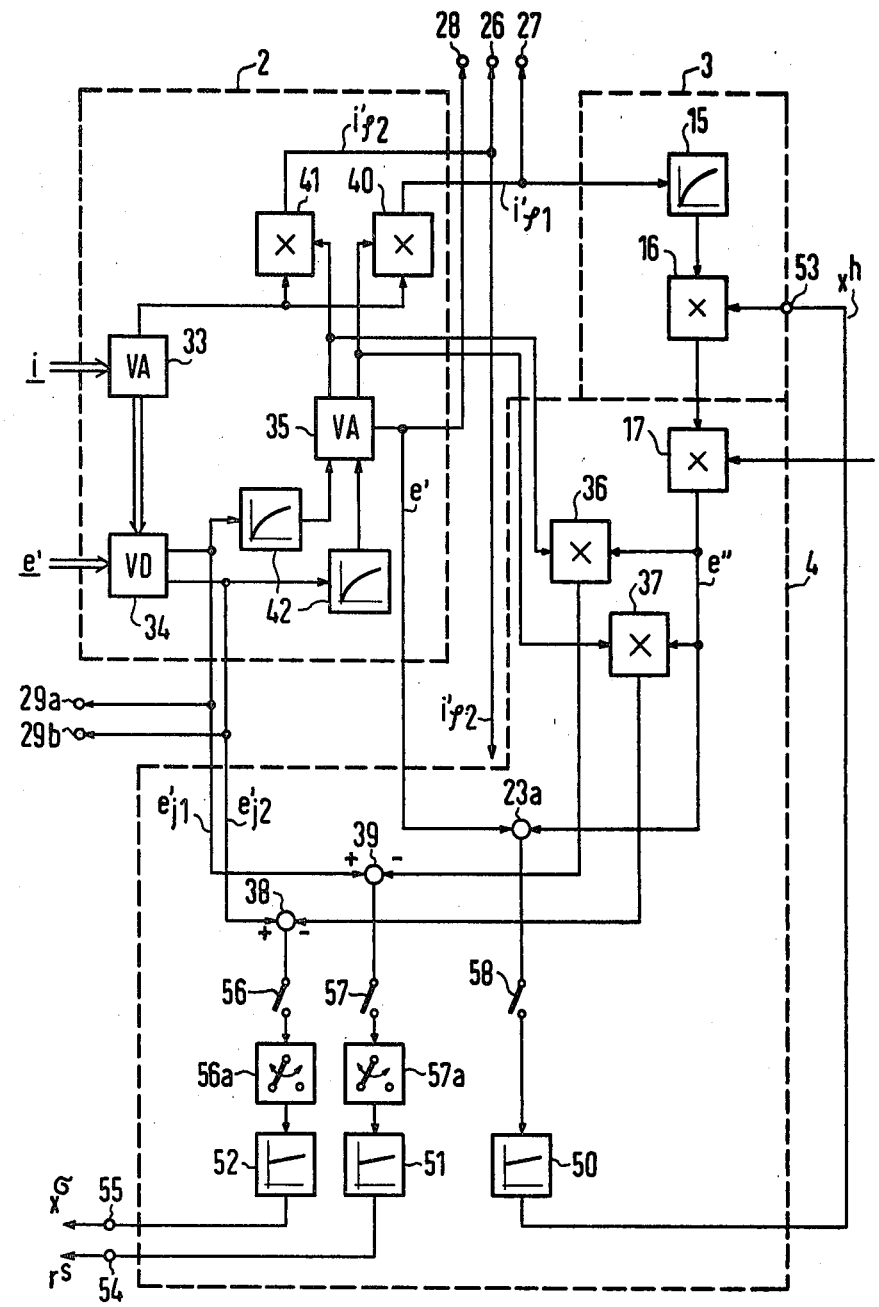
FIG. 10 shows an embodiment of an arithmetic control circuit, an arithmetic model circuit and a control circuit for the case that there are used as first and second vectors the EMF vectors e', e'' and as determinants selectively the magnitudes e', e'', the component $e'_{j1}$, $e''_{j1}$ parallel to the stator current vector or respectively the component $e'_{j2}$, $e''_{j2}$ of these vectors perpendicular thereto.

FIG. 10 illustrates the arithmetic model circuit, arithmetic control circuit, and control stage for the case shown in FIG. 9, where the point of departure is the EMF vector e' as the first vector correlated with the EMF forming circuit. There is used here that variant of the arithmetic model circuit according to FIG. 9 which manages without the vector analyzer 13a and vector rotator 14. The EMF vector is transformed by the stator-related coordinate system at the vector rotator 34 into a coordinate system revolving with the stator current, and the stator current-oriented components e'$_{j1}$, e'$_{j2}$ of the transformed vector are supplied each to its own subtraction point 38, 39. To these subtraction points are supplied the respective stator current-oriented components e''$_{j1}$, e''$_{j2}$ of the second vector, namely of the EMF vector e'' correlated with the arithmetic model circuit 3. The components thereof can be tapped at the multiplier members 36, 37. Further, there is added to the subtraction point 23a the magnitude of vector e' formed at the vector analyzer 35 and the EMF magnitude e'' belonging to the $\psi''$.

Each of the three control deviations formed at points 23a, 38, 39 is sent to its own integrating regulators 50, 51, 52. The output of regulator 50 is here coupled to an input 53 for the setting of the main inductance parameter $x^{h'}$ at the arithmetic model circuit 3. At minimum control deviation at regulator 50, the corresponding machine parameter can be tapped at input 53. Correspondingly, regulator 51 is switched in on an input 54, at which the parameter value for the stator resistance $r^{s'}$ can be set in the forming circuit. Regulator 52 serves to set the parameter $x^{\sigma'}$ at the setting input 55 of the EME forming circuit.

As the determination of the various parameter values is to take place not at the same time, switches 56, 57, 58 are provided, by which the controllers 50, 51 and 52 can be switched off. But advantageously the regulators are not switched off completely by the switches; rather, only the regulator inputs are cut off, while the setting of a regulator remains stored until this controller is released again.

Since, as has been mentioned, for the determination of the parameters $x^\sigma$ and $r^s$ the control sense may have to be switched, the regulators 51 and 52 are preceded by corresponding switching devices 56a and 57a, by which the regulator input polarity can be reversed as a function of the quantities $i'_{\phi 1}$ and $i'_{\phi 2'}$.

Figure 11:
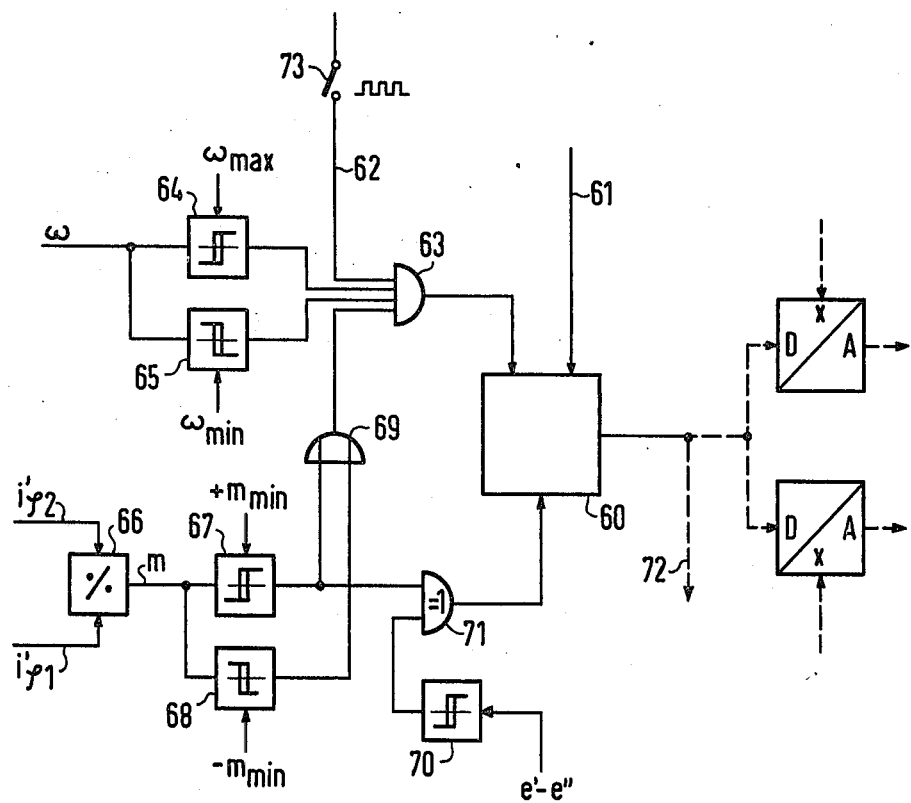
FIG. 11 shows a digitalized arrangement for the control stage.

A corresponding circuit is illustrated in FIG. 11. As integrating regulator is used a digital forward-backward counter 60, in which can be entered by a setting input 61 an initial value as basic setting for the control operation. This basic setting corresponds to a first estimated value, from which the adjustment of the parameter to be determined is effected. To the counter input of counter 60 a pulse train, for example of a frequency of 10 Hz, is supplied via a clock line 62 and an AND gate 63.

Further, for the frequency limitation of the operational states intended for the parameter determination, the stator frequency omega is added to two circuit value switches 64, 65, at which the maximum and the minimum stator frequency can be set. Hence the AND gate 63 is released only in the range $\omega_{min} < \omega < \omega_{max}$. In corresponding manner the operational states intended for the parameter determination can be limited also to the permitted values for the quotient $i'_{\phi 2}/i'_{\phi 1} = m$. If, for example, the determination of the stator resistance parameter value $r^s$ is to be carried out only for $m > m_{min}$ of respectively $m < -m_{min}$, the value for m determined at a quotient former 66 can be added to corresponding limit indicators 67 and 68, the output signals of which are supplied via an OR member 69 to a further input of the AND gate 63. Since further, e.g. for the determination of the stator resistance parameter value considered in FIG. 2, a positive control deviation (e.g. $e' - e'' > 0$) indicates for the case $m > 0$ too small a set parameter value ($r^s - r^{s'} > 0$) and upon change of sign of $i'_{\phi 2}$ or of m a reversal of the control sense is required the sign of the control deviation as well as the sign of the quotient m tapped at the limit indicator 67 can be added via an exclusive OR gate 71 at a limit indicator 70 (to which the control deviation $e' - e''$ is added) to the switching input of the digital counter 60, by which the counter is fixed. At the output 72 of the digital counter 60 the respective parameter value determined for the actual machine parameter is then available.

FIG. 11 can thus be summarized by the statement that the initial (starting) value for the control integration can be entered in the regulator 60 via line 61 and that the controller can be released by a corresponding release signal (e.g. by addition of the clock signal by means of switch 73), the controller output signal being able to be stored if the input is not released. Advantageously, further, a switching device is provided for reversing the polarity at the controller input as a function of $i'_{\phi 2}$ or $i'_{\phi 2}/i'_{\phi 1}$.

The circuit according to FIG. 10, where for the adjustment of the stator resistance a current-oriented component of the EMF vector $e'$ is used, differs from the circuit according to FIG. 6 by greater cost of instrumentation. But this circuit is nevertheless advantageous if at unknown values for $x^h$ and $x^\sigma$ the stator resistance is to be determined.

If, in fact, the drive is operated in idling (m=0), the current vector will, at correctly set stator resistance parameter, coincide at least in the lower frequency range with the direction of the flux vector, so that the component of vector $e'$ parallel to the stator current disappears. This is true independently of the set values for $x^{\sigma'}$ and $x^{h'}$, so that for a presetting of the stator resistance merely the parameter value $r^{s'}$ must be changed until $e'_{j1} = 0$. To this end, an output 29b is provided, at which the component $e'_{j1}$ is brought out of the EMF forming circuit or the arithmetic control circuit. Analogously, of course, $\phi'_{j2}$ may be used instead of $e'_{j1}$.

Further it is advantageous to use in the circuit according to FIG. 10 the adjustment of the stray inductance $x^\sigma$ by adjustment of the component of the vectors $e'$ and $e''$ perpendicular to the current. This makes it possible to determine the parameter value $x^\sigma$ independently of the value for $r^s$ in a short-circuit test before the start of the normal operation of the asynchronous machine.

To this end, the rotor is blocked while the stator current revolves at high frequency (preferably more than 50% of the nominal frequency). Thereby the load angle becomes almost 90°, while the magnetization current component $i'_{\phi 1}$ is almost zero. Hence the EMF vector e lies practically parallel to the stator current vector i, and it suffices to shift the parameter value $x^{\sigma'}$ so that the component $e'_{j2}$ perpendicular to the current, which in FIG. 10 is brought out at output 29a, of the estimated EMF vector $e'$ becomes zero. The parameter value $r^{s'}$ enters only into the component $e'_{j1}$ through the ohmic stator resistance parallel to the current and therefore does not influence this determination of $x^\sigma$.

As a physical equivalent to this, in the arrangement according to FIG. 6 the parameter value $x^{\alpha'}$ can be changed until the two components $e'_{\alpha 1}$, $e'_{\alpha 2}$—available at the outputs 29a, 29b—of the EMF vector $e'$ determined by the EMF former in the stator reference system are both minimum, since a reactive current component of $e'$ occurring at imprecise adjustment of $x^{\sigma'}$ always means an enlargement of the vector $e'$ as compared with an EMF vector which has only an active current component. Likewise, of course, also the fact that that in the short circuit test the magnetization current component is minimum can be utilized for the $x^{\sigma'}$ determination, in that $x^{\sigma'}$ is varied until a minimum value of $i'_{\phi 1}$ is present at output 27.

In the general case, the preadjustment of the stator resistance $r^s$ can be effected by measuring with a measuring device the ohmic resistance at the machine terminals, entering it as basic adjustment in the EMF forming circuit and the associated regulator (e.g. 20 in FIG. 6, or 51 in FIG. 10). Alternatively, at constant stator frequency, a stator current can be impressed and the parameter $r^s$ shifted so that $e' = 0$. Likewise, of any desired estimated values for $x^\sigma$ and $x^h$ at low stator frequency one can let the stator resistance be determined by the apparatus itself and store it in the regulator, the mis-setting of the parameters $x^\sigma$ and $x^h$ being of little influence.

If a starting value for the stray inductance parameter value $x^\sigma$ is not determined according to the above-mentioned shortcircuit test, one can place in memory as starting value for the determination of this parameter an estimated value and determine the true parameter value in the course of normal operation with the device, provided a preadjustment has been made for the parameter values $r^s$ and $x^h$. The preadjustment of $x^h$ is effected advantageously at higher speeds of rotation and in idling.

Figure 5:
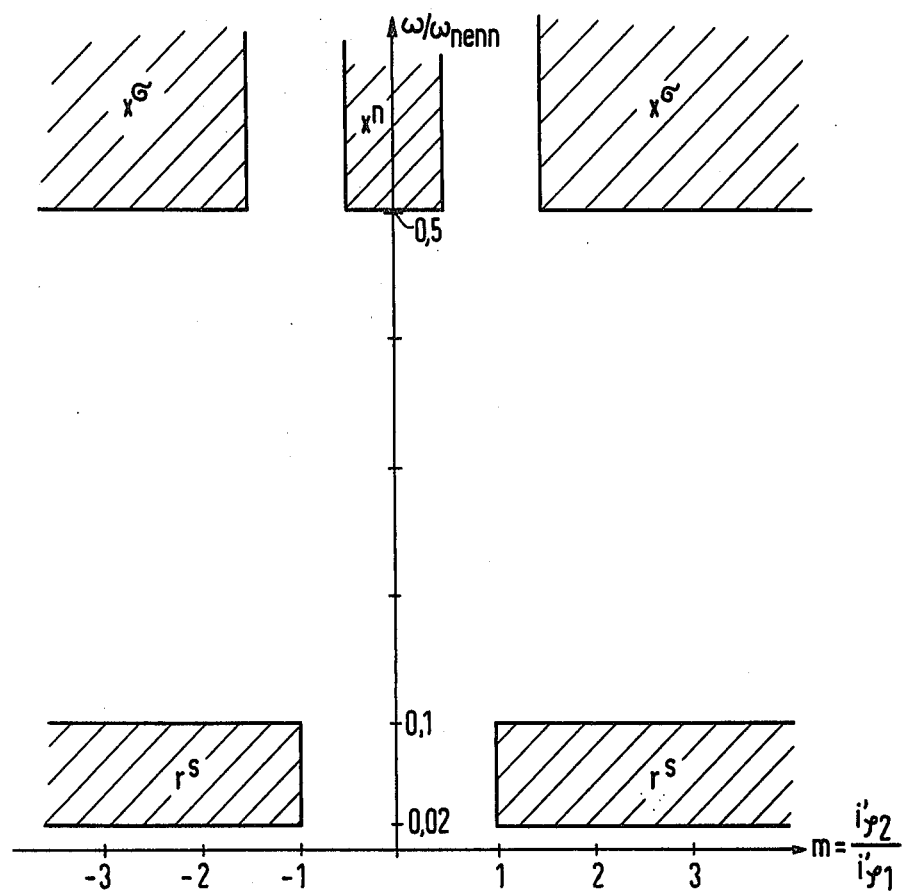
FIG. 5 shows advantageous operating state ranges in which the respective parameter value is determined with the machine running.

If, possibly after repeating the preadjustments several times, under normal operation of the asynchronous machine, the individual parameter values are now determined in the ranges indicated in FIG. 5 with the device according to the invention, and if the value last determined is stored, there is available in the memories a set of parameter values by which the parameters of the asynchronous machine are expressed with good accuracy.

If as first vector in the EMF forming circuit 1 the correlated flux vector $\psi'$ of the rotor flux is determined, then, as has been mentioned before, by componentwise integration of the stator $EMF_\mu - r^{s'} i$ the stator flux vector can be formed and subsequently by componentwise subtraction of $x^\sigma i$ the correlated rotor flux vector $\psi'$ can be formed.

If, however, the correlated EMF vector $e'$ is to be formed, when a differentiation is necessary, and the vector to be differentiated must now show too sudden a time variation and therefore must, as a rule, be subjected to a prior slight smoothing. A smoothing, however, causes an error in phase and magnitude. This error is practically insignificant when all quantities entering in the equation to be solved by the integration are subjected to the same smoothing. The output quantities are then means which are related with the unsmoothed output quantities of a mathematical integration through the same smoothing-time curve. This, however, requires per se separate, carefully matched smoothing members for each input quantity.

Figure 12:
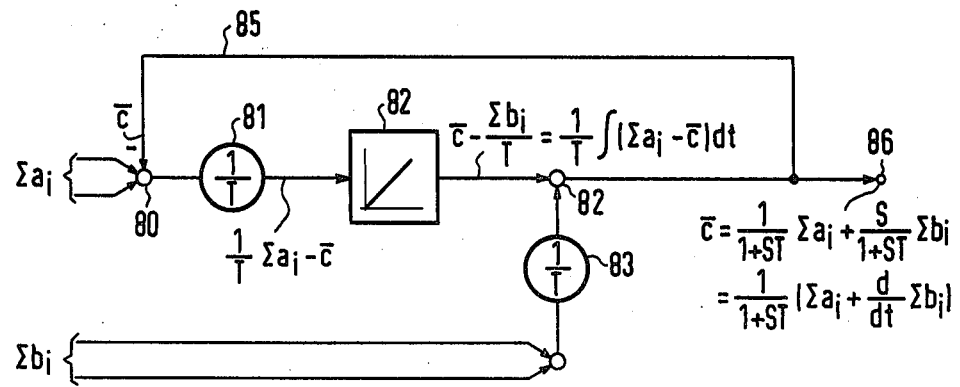
FIG. 12 shows a block diagram of a circuit for determining an EMF-vector component.
Figure 13:
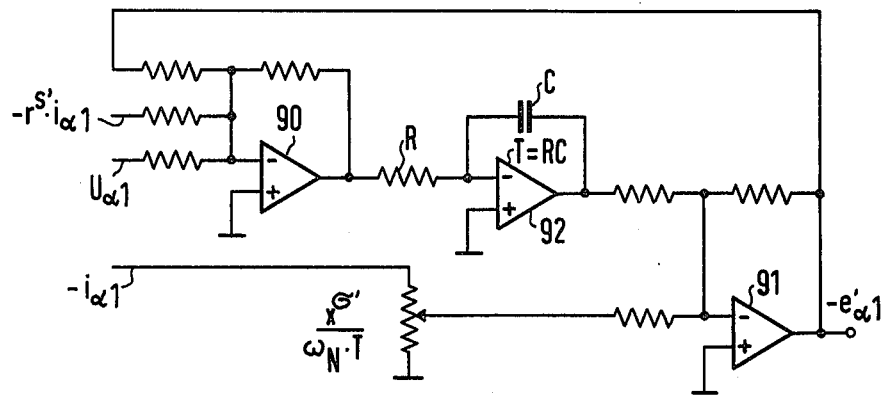
FIG. 13 shows an embodiment of a circuit for determining an EMF-vector component using operational amplifiers.

In the circuit according to FIGS. 12 and 13, the cost of smoothing is low. The circuit according to FIG. 12 is suitable generally for solving an equation $$C = \Sigma a_i + \Sigma d/dt\, b_i$$

where the output quantity $\overline{c}$ is obtained as smoothed quantity c with a smoothing-time curve $\overline{c} = 1/1 + sT$, T being the smoothing time constant and s the operatior of the Laplace transformation. The smoothed equation, in fact, can be transformed to:

$$\overline{C} = 1/1 + sT \Sigma a_i + S/1 + sT \Sigma b i$$

$$(1 + sT)\, \overline{C} = \Sigma a_i + s \Sigma b i_1$$

$$\overline{C} + T d/dt\, \overline{C} = \Sigma a_i + \Sigma d/dt\, bi$$

$$\overline{C} - \Sigma a_i = d/dt(\Sigma bi - \overline{c})$$

10 and finally $$\overline{C} = 1/T \cdot \int (\Sigma a_i - \overline{C}) dt + \Sigma bi/T$$

Accordingly, at a sum point 80 there is added to the input quantity $\Sigma a_i$ the inverted signal—$\overline{c}$ of the output 86 via a feedback line 85. The sum signal is supplied with the proportionally factor 1/T (proportional member 81) to an integrator 82 and added to the input quantities $b_1$—likewise multiplified by 1/T—at a second sum point 84. The output signal of the sum point is the desired smoothed output quantity $\overline{c}$.

FIG. 13 shows a realization of this circuit which as an EMF detector calculates the EMF component $e'_\alpha = -\mu_\alpha - r^{s'}i_\alpha - x^{\sigma'} d/dt\, i_\alpha$ as smoothed component $$\overline{e}_\alpha = \frac{1}{1 + sT}(\mu_\alpha - r^{s'} i_\alpha) - \frac{x^\sigma}{\omega_{nenn}} \cdot \frac{s}{1 + sT}$$

$i_\alpha, x^{\sigma'}$ being scaled to the nominal frequency for reasons of dimension.

An identical circuit is provided also for $e'_\beta$. The sumpoints 80, 84 as well as the integrator 82 are realized by operational amplifiers 90, 91, 92, the proportionalities being given by the resistance wiring of the operational amplifiers.

We claim:

1. Apparatus for determining the actual value of at least one of the stator resistance, the main inductance and the stray inductance parameters of an asynchronous machine having associated operating stator current and stator voltage vectors, from preset values of said parameters, comprising an EMF-forming circuit coupled to receive signals from said machine corresponding to said stator vectors and designed to develop a first vector signal representative of the EMF and the flux of the machine based on said stator vector signals and said preset values of said stator resistance and said stray inductance parameters;

an arithmetic control circuit coupled to receive said signals from said machine, coupled to receive said first vector signal, designed to develop a control signal representative of a component of the magnetization current of said machine correlative of said preset values, and also designed to develop a derivative signal characteristic of the first vector signal;

an arithmetic model circuit for simulating magnetic field development by the machine, coupled to receive said control signal and designed to develop a model flux signal characteristic of the machine flux correlated to said preset value of said main inductance parameter; and a control circuit coupled to receive said model flux signal and said derivative signal characteristic of the first vector signal, and providing a comparable signal characteristic of a second vector, said second vector being representative of an EMF or a flux based on said model flux signal, and comprising a balancing circuit for readjusting the values of said parameters until a balanced condition exists between said derivative signal and said comparable signal.

2. Apparatus according to claim 1, wherein the arithmetic control circuit comprises: a vector analyzer coupled to receive said first vector signal and designed to develop a direction signal representative of the direction of this vector, and a vector transformer coupled to receive said direction signal and said signals corresponding to the stator current vector and designed to develop said control signal.

3. Apparatus according to claim 1, wherein the control circuit comprises: a multiplication circuit coupled to receive said model flux signal and a frequency signal representative of the stator frequency of the machine and designed to develop said comparable signal, a summation circuit coupled to receive said comparable signal and said derivative signal and designed to develop a summation signal, an integrating regulator coupled to receive said summation signal and designed to develop an actual parameter signal representative of said actual parameter values in a balanced condition between said derivative signal and said comparable signal, and a setting input/output coupled to tap said actual parameter signal and to feed said preset values.

4. Apparatus according to claim 1, wherein the arithemetic model circuit comprises a filter coupled to receive said control signal and designed to develop a smoothed control signal, and
 a multiplicating circuit coupled to receive said smoothed control signal and said preset value of said main inductance parameter and designed to develop said model flux signal.

5. Apparatus according to claim 1, wherein the EMF-forming circuit further comprises
 a first multiplication circuit coupled to receive said signals corresponding to the stator current vector and to said preset stator resistance parameter value and designed to develop a first signal representative of an ohmic voltage drop,
 a differentiation circuit coupled to receive said signals corresponding to the stator current vector and designed to develop a differentiation signal representative of a component-wise differentiation of said stator current vector,
 a second multiplication circuit coupled to receive said differentiation signal and said preset stray inductance parameter value designed to develop a second signal representative of a stray inductance drop, and
 a subtraction circuit coupled to receive said first and second signals and said stator voltage vector and designed to develop said first vector signal by subtracting said first and second signals from said stator voltage vector.

6. Apparatus according to claim 1, where the EMF-forming circuit is designed to develop said first vector signal representative of the EMF of the machine, and wherein the arithmetic control circuit further comprises: a vector analyzer circuit coupled to receive said first vector signal and designed to develop said derivative signal representative of at least one of the magnitude, and the component parallel to the stator current vector, and the component perpendicular to the stator current vector, of said first vector; and wherein the control circuit further comprises a calculator circuit coupled to receive said model flux signal and designed to deliver said comparable signal representative of at least one of the magnitude, and the component parallel to the stator current vector, and the component perpendicular to the stator current vector of said second vector, said second vector representing the time deviation of a vector pointing in the direction of the component of the magnetization current represented by said control signal, whose magnitude is given by the model flux calculated in the arithmetic model circuit.

7. Apparatus according to claim 1 where the EMF-forming circuit is designed to develop said first vector signal, representative of the flux of the machine, wherein the arithmetic control circuit further comprises: a vector analyzer circuit coupled to receive said first vector signal and designed to develop said derivative signal representative of at least one of the magnitude, and the component parallel to the stator current vector, and the component perpendicular to the stator current vector of said first vector signal,
 and wherein the control circuit further comprises: a calculator circuit coupled to receive said model flux signal and designed to provide said comparable signal representative of at least one of the magnitude, and the component parallel to the stator current vector, and the component perpendicular to the stator current vector, of said second vector, said second vector pointing in the direction of said first vector signal and having a magnitude equal to the model flux signal developed in the arithmetic model circuit.

8. Apparatus according to any of the claims 1, 2, 3, 4, 5, 6 or 7 further comprises means coupled to the control circuit to operate the control circuit for the determination of the actual parameter value of the stator resistance at low stator frequency and high load of the asynchronous machine.

9. Apparatus according to any of the claims 1, 2, 3, 4, 5, 6 or 7 further comprises means coupled to the control circuit to operate the control circuit for the determination of the actual parameter value of the stray inductance at higher frequency and higher load of the asynchronous machine.

10. Apparatus according to any of the claims 1, 2, 3, 4, 5, 6, or 7 further comprises means coupled to the control circuit to operate the control circuit for the determination of the actual parameter value of the main inductance at higher frequencies and in operational conditions correlated to the idling asynchronous machine.

11. Apparatus according to any of the claims 1, 2, 3, 4, 5, 6 or 7 wherein the arithemetic control circuit further comprises: arithmetic means operated for determining the actual value of the stator resistance and designed to develop an additional control signal representative of the stator current vector component perpendicular to the component of the magnetization current represented by said control signal,
 and switching means coupled to the input of said balancing circuit and designed to change the input polarity of said balancing circuit upon sign change of said perpendicular component.

12. Apparatus according to any of the claims 1, 2, 3, 4, 5, 6 or 7 wherein the arithemetic control circuit further comprises: arithmetic means operated for determining the actual value of the stray inductance and designed to develop an additional control signal representative of the stator current component perpendicular to the component of the magnetization current represented by said control signal and designed to form the quotient of that perpendicular component and the correlated magnetization current component,
 and wherein the control circuit further comprises switching means coupled to the input of the balancing circuit designed to change the input polarity of said balancing circuit due to the change of the value of the quotient from a value smaller than 1 to a value exceeding 1.

13. Apparatus according to claim 1, wherein the balancing circuit further comprises: a plurality of integrating regulators, each regulator correlated to each parameter value, coupled to a setting input associated to said balancing circuit to tap said actual parameter signal and to feed said preset parameter value, and multiplex switching means associated to the integrating regulators and designed to operate the integrating regulators by time multiplex.

14. Apparatus according to any of the claims 1, 2, 3, 4, 5, 6 or 7 or 13, wherein the balancing circuit comprises: means to receive signals representative to the starting value of the balancing process, a releasing circuit coupled to receive a release signal and designed to start the balancing process and storing means associated to the balancing circuit designed to store the balance circuit output signals.

15. Apparatus according to any of the claims 1, 2, 3, 4, 5, 6 or 7 or 13, wherein the balancing circuit further comprises: an integrating regulator coupled to receive signals representatives of starting values of the balancing process and designed to develop integrating signals representatives of said parameter values, a release circuit coupled to said regulator to release said regulator by a release signal and, storing means associated to said regulator to store the signal developed by the regulator.

16. Apparatus according to any of the claims 5, 6 or 7 further comprises: output means coupled to receive at least one of the signals representing the component parallel to the stator current vector of the EMF vector, and the component perpendicular to the stator current vector of the flux vector, and preset means associated to the control circuit and designed to continuously preset said parameter value of the stator resistance until in idling and at lower stator frequencies of the asynchronous machine the signals appearing at said output means indicate said component appearing at said output means, being at a minimum.

17. Apparatus according to any of the claims 5, 6, or 7 further comprises: output means coupled to receive at least one of the signals representing the correlated magnetization current component and the component perpendicular to the stator current vector of the EMF vector and the component parallel to the stator current vector of the flux vector, blocking means coupled to the machine and designed to block the rotor of said machine while the rotor current circles with higher frequency, and preset means coupled to the control circuit and designed to continuously preset the parameter value of the stray inductance until the signals appearing at said output means are at a minimum.

18. Apparatus according to claim 1, wherein the EMF-forming circuit further comprises: a circuit for determining a component of the EMF-vector correlated to the EMF-forming circuit by determining a value specified by the equation:

$$\bar{c} = \frac{1}{1 + sT} \Sigma a_i + \frac{s}{1 + sT} \Sigma b_i$$

wherein $\bar{c}$ represents the smoothed EMF-vector component to be determined s represents the operator of the Laplace transformation T represents the smoothing time constant $\Sigma a_i$ represents a first input quantity $\Sigma b_i$ represents a second input quantity.

19. Apparatus according to any of the claims 1 or 18 wherein the EMF-forming circuit further comprises: a component detecting circuit comprising for each component, first summation means coupled to receive signals representative of a component of the stator voltage vector, the product of the preset value of the stator resistance and a component of the stator current vector, and the negative input value of the detecting circuit, and designed to provide a sum signal representative of the sum of the input signals, integrating means coupled to receive said sum signal and designed to develop an integrating signal representative of the integrated sum signal, second summation means coupled to receive the integrated sum signal and a signal proportional to the product of the preset value of the stray inductivity and a component of the stator current vector and designed to deliver a detecting circuit output signal representative of the sum of said input signals.

20. Apparatus according to claim 1, wherein the arithmetic control circuit comprises a vector analyzer coupled to receive said first vector signal and designed to develop a direction signal representative of the direction of this vector, and a vector transformer coupled to receive said direction signal and said signals corresponding to the stator current vector and designed to develop said control signal;

the arithemetic model circuit comprises a filter coupled to receive said control signal and designed to develop a smoothed control signal, and a multiplicating circuit coupled to receive said smoothed control signal and said preset value of said main inductance parameter and designed to develop said model flux signal; and the control circuit comprises a multiplication circuit coupled to receive said model flux signal and a frequency signal representative of the stator frequency of the machine and designed to develop said comparable signal, a summation circuit coupled to receive said comparable signal and said derivative signal and designed to develop a summation signal, an integrating regulator coupled to receive said summation signal and designed to develop an actual parameter signal representative of said actual parameter values and a balanced condition between said derivative signal and said comparable signal, and a setting input/output coupled to tap said actual parameter signal and to feed said preset values.

* * * * *